United States Patent [19]

Grubbs et al.

[11] Patent Number: 4,996,534
[45] Date of Patent: Feb. 26, 1991

[54] PROCESSING OF CONCATENATED RADAR MEASUREMENTS TO RE-ESTABLISH SIGNAL PHASE COHERENCE

[75] Inventors: Robert A. Grubbs, Riverside, Calif.; Gregory P. Brown, Celeste, Tex.

[73] Assignee: Hughes Aircraft Company, Los Angeles, Calif.

[21] Appl. No.: 456,017

[22] Filed: Dec. 21, 1989

[51] Int. Cl.$^5$ .............................................. G01S 7/30
[52] U.S. Cl. ...................................... 342/195; 342/196
[58] Field of Search ........................ 342/112, 195, 196

[56] References Cited

U.S. PATENT DOCUMENTS 3,896,434  7/1975  Sirven ........................................ 342/
4,667,200  5/1987  Gellekink et al. ......................... 342/
4,916,452  4/1990  Borchert et al. .......................... 342/

Primary Examiner—Mark Hellner
Attorney, Agent, or Firm—Wanda K. Denson-Low

[57] ABSTRACT

A method and apparatus for re-establising frequency, phase and amplitude coherence for radar samples generated by mutiple frequency transmitter pulse trains. A plurality of transmitter means 10–12 produce pulses of different frequencies and an antenna 22 and waveguide 24 direct the pulses 26 towards the aircraft 30. The reflected radar signal 32 returns to the antenna 22 and waveguide 24 and is measured by the receiver 14. The reflected radar signal is then frequency rescaled, phase realigned, and amplitude normalized by the computer processor 18 and output to a processor/display unit 20.

16 Claims, 1 Drawing Sheet

PROCESSING OF CONCATENATED RADAR MEASUREMENTS TO RE-ESTABLISH SIGNAL PHASE COHERENCE

This invention was made with Government support under Contract No. DAAB07-C-P031 awarded by the Department of the Army. The Government has certain rights in this invention.

BACKGROUND OF THE INVENTION

1. Technical Field

This invention relates to methods of signal processing for jet aircraft identification and, more particularly, processing reflected radar samples with multiple frequencies and random phases as if they were coherent.

2. Discussion

There exist several jet aircraft identification techniques that require long sequences of coherent radar samples to be collected and processed. For surveillance radar systems which employ rotating antenna arrays, it is often the case that insufficient time is available to collect this data on a single scan at a single transmitter frequency. Some of these systems are able to dwell on a target for longer periods by employing beam backscanning, which is accomplished by several transmitter frequency changes. Thus, the required time on target can then be attained. One of the consequences of beam backscanning at multiple frequencies is loss of signal phase coherence, which is critical to jet aircraft identification. Previous solutions to this problem have proven inadequate or impractical in that they severely degraded the radar system's acquisition and tracking functions, or have failed to re-establish signal coherence sufficiently to permit aircraft identification.

One possible technique involves slowing antenna scan rates considerably to attain the required time on target. The disadvantage of this solution is that search detection and acquisition probabilities are significantly reduced, and tracking performance is degraded to an unacceptable level. Another possible technique included multiple sensors and apertures dedicated to target identification. This solution has been deemed too costly to be marketable.

SUMMARY OF THE INVENTION

Pursuant to the present invention, a signal processing technique is used to re-establish frequency, phase and amplitude coherence for radar samples generated by multiple frequency transmitter pulse trains. A first pulse train at a first transmitter frequency and a second pulse train at a second transmitter frequency are directed towards an airborne object. The radial and ambiguous velocities of the airborne object are measured. The reflected radar samples are then measured for both pulse trains. The reflected radar sample from the first transmitter frequency is then multiplied by a complex function which is derived from the radial velocity of the object, the interpulse period, the speed of light, and the difference between the first transmitter frequency and the given reference frequency to rescale the data to the given reference frequency. To generate a rescaled signal at the given reference frequency, the second reflected radar sample is multiplied by a complex function which is derived from the radial velocity of the object, the difference between the second transmitter frequency and the given reference frequency, the interpulse period, and the speed of light. A Discrete Fourier Transform (DFT) is then performed on the rescaled signal and the magnitude and argument of the DFT are evaluated at the target detection cell. To generate a realigned signal at the given reference phase, the rescaled signal is then multiplied by an additional complex function derived from the argument of the DFT, the target detection cell, the ambiguous velocity of the aircraft, the reference frequency, the interpulse period and the speed of light. To get the phase-coherent signal, the realigned signal is then multiplied by the inverse of the magnitude of the Discrete Fourier Transform to normalize the realigned signal to a given reference amplitude scale. In such manner a phase-coherent signal is generated and can be further processed for identification purposes.

BRIEF DESCRIPTION OF THE DRAWINGS p

The various advantages of the present invention will become apparent to those skilled in the art after reading the following specification and by reference to the drawings in which:

FIG. 1 is a diagrammatic view of an apparatus for directing multiple frequency pulse trains at jet aircraft and processing the reflected signal in accordance with the teachings of this invention; and FIG. 2 is a block diagram showing the steps of a process for re-establishing signal phase coherence in according with the teachings of this invention.

DESCRIPTION OF THE PREFERRED EMBODIMENT

Many of today's surveillance systems use rotating antenna arrays to monitor the sky for airborne objects such as jet aircraft. Jet aircraft identification techniques require that long sequences of coherent radar samples be collected and processed. The probability of tracking and detecting an airborne object is directly proportional to the amount of time that the system has to collect the samples on the target. The number of samples that can be obtained at one frequency decreases proportionally as the antenna's rate of rotation increases. In order to collect enough data on the jet aircraft without slowing the rotating antenna, multiple frequency pulse trains are directed at the airborne object and then are rescaled to a given reference frequency, realigned to a given reference phase, and normalized to a given reference amplitude scale as prescribed in the present invention. Thus, the required information can be obtained without slowing the antenna's rate of rotation. Velocity estimation by doppler shift measurement has been widely applied, and numerous specific techniques for doing this have saturated the literature during this century. The specific technique is not critical to this method.

Once phase-coherence, normalization and rescaling is complete, the signal is then relayed to a computer for further processing. One possible use of the signal would be to correlate it with known reflected radar returns from various aircraft for identification purposes.

Figure 1:
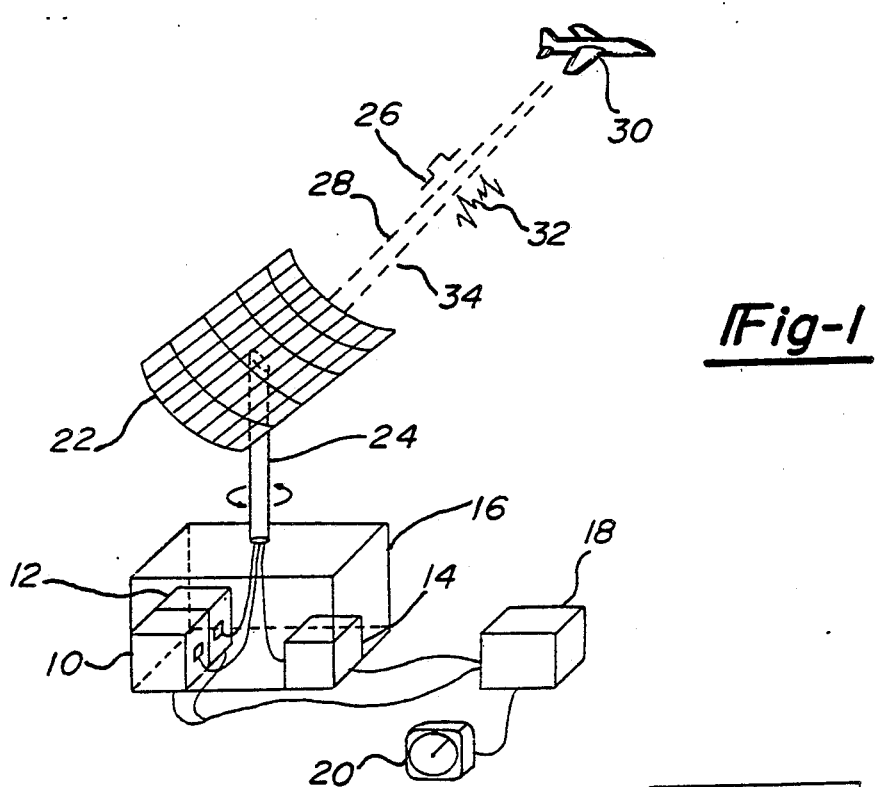

In the embodiment shown in FIG. 1, the signal processing method is used to interrogate jet aircraft 30. A first frequency transmitter means 10, a second frequency transmitter means 12, and a receiver means 14 are shown located in the stationary radar system base 16. The computer processor 18 receives input from the receiver and outputs to the display 20. The rotating antenna 22 directs the pulse trains sent from the first transmitter means 10 and the second transmitter means 12 through a waveguide 24 in the direction that the antenna 22 is directed. The pulse train 26 travels along a path 28 towards the jet aircraft 30. The reflected signal 32 returns along the path 34 to the rotating antenna 22 down the waveguide 24 and into the receiver 14. The receiver 14 then relays the signal to the computer processor 18 where the data is rescaled, realigned, and normalized. The computer processor 18 then outputs the phase coherent signal data to the processor/display unit 20.

The modulated and reflected radar sample (skin return) can be modeled using known models:

$$s''(m,n)=s(n+mN/M)=a(m-)e^{j[2\pi f_d(n+mN/M)T+\Phi_x(m)]} \cdot z(n+mN/M)$$

where m indexes over the M transmitter frequencies, n indexes over the N/M pulses per frequency, N is the number of transmitter pulses, a(m) is the amplitude of the reflected radar sample in Volts, $\Phi_x(m)$ is the phase of reflected radar signal in radians, $z(n+mN/M)$ is the function describing the modulation of the reflected radar sample due to the compressor blades on the aircraft's engines, T is the interpulse period, and $f_d$ is the doppler frequency of the reflected radar sample. The doppler frequency is defined as $$f_d = 2V_r f_p/c = 2V_r[f_o + \Delta f(m)]/c$$

where f(m) is defined as the difference between the transmitter frequency producing the reflected radar sample and the given reference frequency $f_o$, $V_r$ is the radial velocity of the aircraft, and c is the speed of light.

To rescale the reflected radar samples to a given reference frequency, the reflected signal must be broken up into two products. The first product will be the result of the change in transmitter frequency from the given reference frequency in Hertz (Hz) and the second will be composed of the return signal at the given reference frequency in Hz. The first product, the result of the change in transmitter frequency from the given reference frequency, is the inverse of the factor used to rescale the reflected radar sample to the given reference frequency. The reflected radar sample can be rewritten as $$s''(m,n)=a(m)e^{j\{4\pi V_r[f_o+\Delta f(m)](n+mN/M)T/c+\Phi_x(m)\}} \cdot z(n+mN/M)$$

$$s''(m,n)=e^{j[4\pi V_r \Delta f(m)(n+mN/M)T/c]} \cdot a(m)e^{j\Phi_x(m)}e^{j[4\pi V_r f_o(n+mN/M)T/c]} \cdot z(m+mN/M)$$

where the first complex exponential factor contains all of the effects of the frequency scaling phenomena.

Rescaling the reflected radar samples involves a two-step process using the above described results. The first step involves subtracting the given reference frequency from the transmitter frequency to obtain $\Delta f(m)$. The reflected radar sample is then multiplied by $e^{-jx}$ (the inverse of the complex number dependent upon $\Delta f(m)$ where:

$$x = 4\pi V_r \Delta f(m)(n+mN/M)T/c$$

The inverse multiple rescales the reflected radar sample to a measurement collected at the given reference frequency. Coherence is not re-established, however, because the phase of the reflected sample is not necessarily constant over a frequency change.

The reflected radar samples from the different transmitters have different starting phases for their oscillators and, consequently, the reflected radar samples must be realigned. Realigning the reflected radar samples to a given reference phase is further broken down into two steps. The first step involves performing the DFT on the reflected radar signal at the target detection cell $k_D$. The partial (zero-padded) DFT of s'' over the $m^{th}$ reflected radar sample is then:

$$S''(m,k_D) = \sum_{n=0}^{N/M-1} a(m)e^{j\Phi_x(m)}e^{j[4\pi V_a f_o(n+mN/M)T/c]} \cdot e^{-j[2\pi(n+mN/M)k_D/N]}$$

where the modulation factor at the target detection cell is assumed negligible, and the following definitions are made:

$$z(n+mN/M)=1$$

$$|k_D - 2V_a f_o NT/c| \leq 0.5$$

$$0 \leq V_a \leq c/2f_o T.$$

$V_a$ is the ambiguous velocity of the target in meters per second.

Since the summation factor is not a function of m, the partial DFT can be rewritten:

$$S''(m,k_D) = wa(m)e^{j[\Phi_x(m)-2\pi(k_D - 2V_a f_o NT/c)m/M + \Phi_s]}$$

where, $$\sum_{n=0}^{N/M-1} e^{-j[2\pi(k_D - 2V_a f_o NT/c)n/N]} = we^{j\Phi_s}$$

Because wa(m) is a positive real scaler, the argument of the complex exponential is also the argument of $S''(m,k_D)$. $\Phi_x(m)$ can be determined by computing the argument of $S''(m,k_D)$ and adding:

$$2\pi(k_D - 2V_a f_o NT/c)m/M$$

The additional phase $\Phi_s$ is independent of m and M, so it will be constant for all radar samples received.

These results are used to re-establish the phase coherence of the M radar sample blocks. The argument of the DFT of the radar sample at the target detection cell is determined. The reflected radar signal is then multiplied by $e^{j1 \cdot jy}$ where:

$$y = arg[DFT] + 2\pi(k_D - 2V_a f_o NT/c)m/M.$$

Since the transmitter pulse trains are of different frequency values, the power of the transmitter pulses will also be different. The power of the return signal increases relative to the transmitter power and thus the reflected radar signals will need to be normalized. Normalizing the reflected radar samples to a given reference amplitude scale involves performing the DFT on the realigned signal and evaluating the magnitude of the DFT at the target detection cell $k_D$. The radar sample is then multiplied by the inverse of this magnitude to normalize the data.

The same antenna may be used to both transmit pulses and receive samples through known methods such as a duplexer. The antenna forms a directional beam and in this example rotates throughout the entire region to be searched.

It should also be noted that in the embodiment shown, two transmitters are shown. Additional transmitters with other frequencies are added to increase detection and acquisition probabilities.

Figure 2:
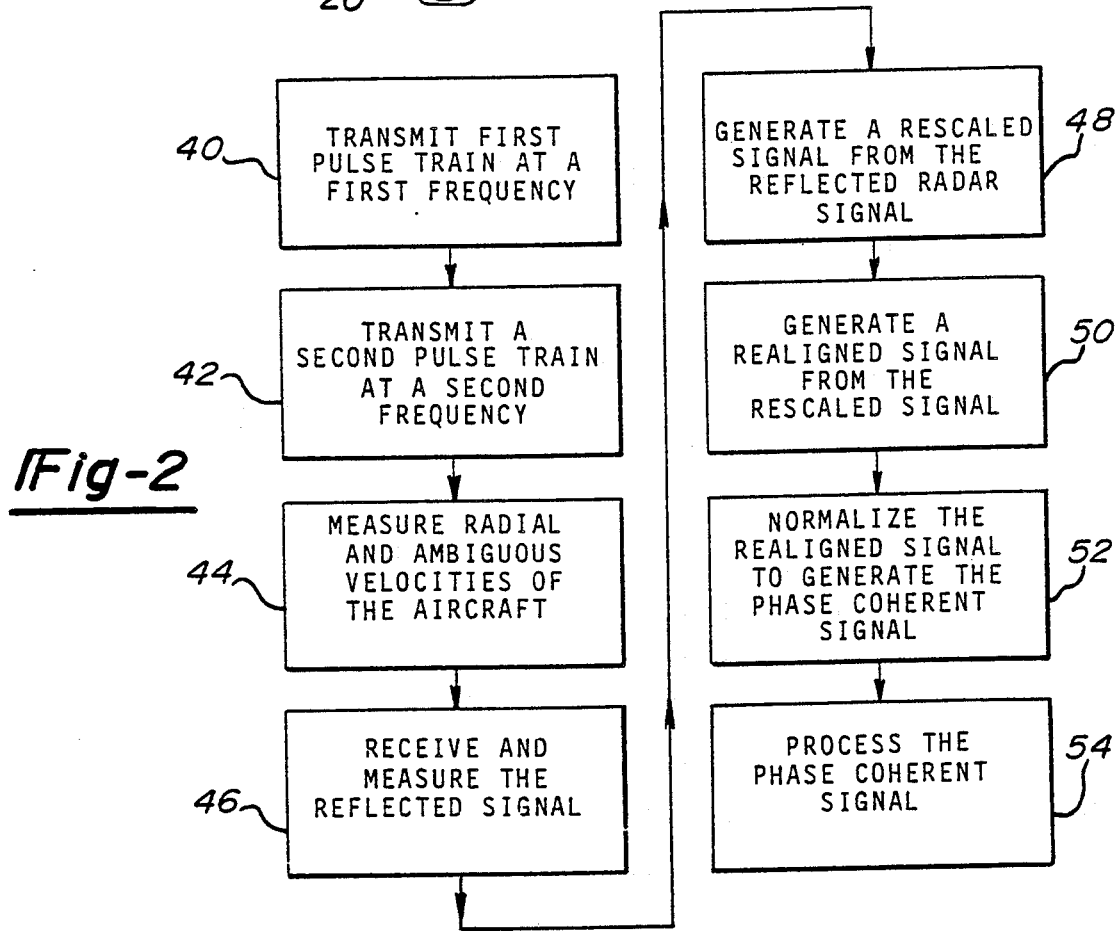

FIG. 2 shows the steps involved in re-establishing signal phase coherence for multiple-frequency transmitter pulse trains directed at airborne objects. The first step 40 involves directing a first pulse from a first transmitter frequency towards the airborne object. The second step 42 requires directing a second pulse at a second frequency towards the airborne object. In the following step 44, the radial and ambiguous velocities of the aircraft are measured by known methods such as doppler estimation. The reflected signal is then received at the antenna and measured as shown in the fourth step 46. Step five 48 involves rescaling the reflected radar samples to a given reference frequency to generate the rescaled signal. Realigning the rescaled signal to a given reference phase to generate the realigned signal is the next step 50. The next step 52 involves normalizing the realigned signal to a given reference amplitude scale to generate the phase coherent signal. In the final step 54, the phase-coherent signal is output for further processing. This processing might include correlating the phase-coherent signal with known reflected radar returns from various aircraft for identification purposes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon study of the specification, drawings and the following claims.

What is claimed is:

1. A method of signal processing for re-establishing frequency, phase and amplitude coherence for radar samples generated by multiple frequency transmitter pulses directed towards, modulated by and reflected from airborne objects having radial and ambiguous velocities wherein said multiple frequency transmitter pulses radiate from an antenna array rotating at a constant rate and wherein the phase, amplitude scale and frequency of said reflected radar samples received at said antenna array are compared with a given reference phase, amplitude scale and frequency, said method comprising the steps of:
   (a) generating a first pulse train at a first transmitter frequency for transmitting said first pulse train towards said airborne object;
   (b) generating a second pulse train at a second transmitter frequency for transmitting said second pulse train towards said airborne object;
   (c) measuring the radial velocity of said airborne object;
   (d) receiving and measuring said reflected radar samples resulting from said first pulse train at said first transmitter frequency and said second pulse train at said second transmitter frequency;
   (e) rescaling said reflected radar samples to said given reference frequency for generating a rescaled signal;
   (f) realigning said rescaled signal to said given reference phase for generating a realigned signal;
   (g) normalizing said realigned signal to said given reference amplitude scale for generating a phase coherent signal; and
   (h) processing said phase coherent signal for identifying said reflected radar samples.

2. The method of claim 1, wherein the step (c) is accomplished by doppler estimation techniques.

3. The method of claim 1, wherein step (e) includes multiplying said reflected radar sample by $e^{-jx}$ where x is derived from said radial velocity ($V_r$), the difference between said transmitter frequency producing said reflected radar sample and said reference frequency ($\Delta f(m)$), the interpulse period (T) and the speed of light (c).

4. The method of claim 1, wherein step (f) includes performing a Discrete Fourier Transform on said reflected radar sample and evaluating the argument of said Discrete Fourier Transform at the target detection cell ($k_D$).

5. The method of claim 4, wherein the realigning includes multiplying said reflected radar sample by $d^{-jy}$ where y is derived from said argument of said Discrete Fourier Transform, said target detection cell ($k_D$), said reference frequency ($f_0$), said interpulse period (T) and said ambiguous radial velocity ($V_a$).

6. The method of claim 1, wherein step (g) includes performing a Discrete Fourier Transform on said reflected radar samples and evaluating the magnitude of said Discrete Fourier Transform at the target detection cell ($k_D$).

7. The method of claim 6, wherein the normalization includes dividing said reflected radar sample by said magnitude of said Discrete Fourier Transform.

8. The method of claim 3, wherein $$x = 4\pi V_r \Delta f(m)(n + mN/M)T/c$$

where N is the number of transmitter pulses, M is the number of transmitter frequencies, n indexes the N/M pulses per frequency, and m indexes over said M transmitter frequencies.

9. The method of claim 5, wherein $$Y = arg[DFT] + 2\pi(k_D - 2V_a f_0 NT/c)m/M$$

where n indexes over the N/M pulse frequency, N is the number of transmitter pulses per transmitter frequency, M is the number of transmitter frequencies, and m indexes over the M transmitter frequencies where arg[DFT] defines the argument of the Discrete Fourier Transform for said reflected radar sample at said target detection cell.

10. The method of claim 1, wherein said first pulse train at said first transmitter frequency occurs at a different time from said second pulse train at said second transmitter frequency to distinguish said reflected radar samples.

11. The method of claim 1, wherein additional transmitter frequencies are added to increase detection and acquisition probabilities, and to increase electronic backscanning range.

12. The method of claim 1, wherein additional pulses per frequency are added to increase detection and acquisition probabilities.

13. Apparatus for generating and directing multiple frequency transmitter pulse trains at airborne objects traveling at radial and ambiguous velocities and for processing the modulated and reflected radar signal at a reference frequency, amplitude scale, and phase, said apparatus comprising:

(a) antenna means for directing and focusing said multiple frequency transmitter pulse trains at said airborne objects;

(b) first frequency transmitter means for producing a first pulse train of a first period at a first frequency;

(c) second frequency transmitter means for producing a second pulse train of a second period at a second frequency;

(d) receiving means for receiving and measuring said reflected signal;

(e) rescaling means for producing rescaled signals at said reference frequency from said reflected radar signals;

(f) realigning means for producing realigned signals at said reference phase from said rescaled signals;

(g) normalizing means for producing phase coherent signals at said reference amplitude scale from said realigned signal; and (h) processor means for analyzing said phase coherent signals.

14. The apparatus of claim 13, wherein each successive pulse train is followed by a time delay to differentiate said reflected signals, and to select a different transmitter frequency for subsequent measurements.

15. The apparatus of claim 13, which further comprises additional transmitter frequency means for producing pulses of a given period at additional frequencies.

16. The apparatus of claim 13, which further comprises an output means for displaying said phase coherent signals.

* * * * *